US006666698B2

(12) United States Patent
Beck, Jr. et al.

(10) Patent No.: US 6,666,698 B2
(45) Date of Patent: Dec. 23, 2003

(54) ARC LIMITING ELECTRICAL CONNECTOR ASSEMBLY

(75) Inventors: Hoy Smith Beck, Jr., Lexington, NC (US); Jeremy Christin Patterson, Greensboro, NC (US); Donald Robert Worthington, Pfafftown, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/929,432

(22) Filed: Aug. 14, 2001

(65) Prior Publication Data

US 2002/0022391 A1 Feb. 21, 2002

Related U.S. Application Data

(60) Provisional application No. 60/225,905, filed on Aug. 17, 2000.

(51) Int. Cl.[7] ........................ A01R 13/53
(52) U.S. Cl. ........................ 439/181; 439/157; 439/350
(58) Field of Search ........................ 434/157, 358, 434/489, 357, 353–355, 181

(56) References Cited

U.S. PATENT DOCUMENTS

| | | | | | |
|---|---|---|---|---|---|
| 3,869,191 | A | | 3/1975 | Tolnar, Jr. et al. | |
| 3,933,406 | A | | 1/1976 | Cameron et al. | |
| 4,010,998 | A | | 3/1977 | Tolnar, Jr. et al. | |
| 4,026,624 | A | * | 5/1977 | Boag | 439/358 |
| 4,915,643 | A | * | 4/1990 | Samejima et al. | 439/489 |
| 4,979,910 | A | * | 12/1990 | Revil et al. | 439/357 |
| 5,183,410 | A | * | 2/1993 | Inaba et al. | 439/357 |
| 5,338,219 | A | * | 8/1994 | Hiramoto et al. | 439/489 |
| 5,409,395 | A | | 4/1995 | Okada | |
| 5,542,425 | A | | 8/1996 | Marshall et al. | |
| 5,624,271 | A | * | 4/1997 | Childs et al. | 439/357 |
| 6,019,618 | A | | 2/2000 | Nakata | |
| 6,068,507 | A | * | 5/2000 | Popa | 439/489 |
| 6,146,161 | A | * | 11/2000 | Osawa | 439/157 |
| 6,151,222 | A | | 11/2000 | Barrett | |
| 6,204,652 | B1 | | 3/2001 | Albou et al. | |
| 6,217,356 | B1 | | 4/2001 | Davis et al. | |
| 6,332,800 | B2 | * | 12/2001 | Kodama | 439/352 |
| 6,343,948 | B1 | * | 2/2002 | Nutzel | 439/358 |

* cited by examiner

*Primary Examiner*—Renee Luebke
*Assistant Examiner*—Felix D. Figueroa

(57) ABSTRACT

In electrical connector assemblies 2, 102 comprising mating receptacle and plug connectors, a force is generated during mating which urges the receptacle and plug connectors away from an intermediate, partially mated position in which arcing might occur between terminals in the mating connectors. This force can be generated when an inertial protrusion 24 on receptacle connector 10 engages an inertial protrusion 56 on a plug connector 50. This force can also be generated when movement of an over-center lever 170 results in deformation of a cantilever beam 120 when a receptacle connector 110 is mated to a plug connector 150. These connector assemblies 2, 102 can be used to limit damage to mating terminals in a 42 volt automotive electrical connector system.

22 Claims, 7 Drawing Sheets

ARC LIMITING ELECTRICAL CONNECTOR ASSEMBLY

This application claims benefit of provisional 60/225,905 filed Aug. 17, 2000.

BACKGROUND OF THE INVENTION

1. Field of the Invention

This invention relates to the suppression or prevention of arcing between electrical connectors as the connectors are mated and unmated so as to minimize potential damage to mating contacts due to arcing. This invention also relates to mating electrical connectors which are mechanically unstable in an arc susceptible position so that spring or biasing forces are generated that will tend to physically move the mating connectors away from a partially mated, arc susceptible position. This invention is also related to the generation of inertial forces due to the deformation of connectors housing members during mating in such a way that the inertial forces will tend to move the connectors away from a partially mated, arc susceptible position.

2. Description of the Prior Art

Currently there appears to be no inexpensive and reliable technology to prevent arcing at relatively low voltages of approximately 50 volts or less in electrical connectors. A 42-volt electrical architecture will soon be adopted for automotive electrical systems, and arcing is a problem that must be addressed. Any solution to this problem should be fully automatic and allow safe hot mate and unmate without damage to an operator or appreciable damage to the connector or the connector terminals.

U.S. Pat. No. 6,217,356 discloses one approach to prevent damage to mating terminals due to arcing. A secondary contact surface is provided at the tip of a terminal that mates with a pin terminal. Arcing damage is limited to the secondary contact surface and the portion of the pin that first comes close to the secondary or sacrificial contact surface. The main contact regions on both mating terminals are spaced from the sacrificial areas. This type of solution adds length and size to the terminals and to the electrical connectors in which they would be used. Therefore it has disadvantages when applied to an application in which a large number of terminals are positioned in a single connector and in which space and mating force are serious considerations.

If electrical connectors are properly mated and not mated and unmated under load, arcing is not a problem. A great deal of effort has been expended to provide to insure that automotive electrical connectors are properly mated. Mechanical assist devices, such as levers, are commonly employed. Guide plates eliminate stubbing during mating to prevent damage to the terminals. Guide plates also protect an operator from shocks. Connector position assurance devices that can only be manually actuated if the connectors are fully mated are also employed to insure that electrical connectors have been fully mated.

Another approach that has been employed is the use of inertial locks which will either snap connectors into a fully mated configuration or will force the connectors apart. U.S. Pat. No. 4,010,998 discloses the use of an inertia lock in which, once a sufficient mating force has been applied, mating cannot be stopped until the connectors are locked and the connector terminals are fully engaged. If an insufficient manual force is applied, the inertia lock will cause the connectors to "self reject". The inertial lock mechanism shown in U.S. Pat. No. 4,010,998 includes a latch arm on one connector that is deflected outward over a triangular locking ramp. The maximum mating force of the inertial lock mechanism is greater than the overall engagement force of the terminals so that the mating force tending to latch the connectors in place will be greater than the terminal engagement force. In other words, the maximum connector mating force exceeds the overall terminal engagement force. In many applications, such as automotive connector assemblies, the mating force is already too great and mechanical assist means, such as levers or bolts must be employed. However, these inertial locks are not typically used in conjunction with mechanical assist levers and guide plates and they are not used to prevent the connectors from occupying an intermediate, partially mated configuration in which mating terminals are in close proximity and susceptible to arcing.

SUMMARY OF THE INVENTION

The introduction of 42 volt electrical systems in automobiles and motor vehicles causes some concern that electrical terminals may be subject to arcing as electrical connectors are mated or unmated under load. Arcing has not been a significant problem for standard 14 volt electrical systems, because 14 volts is below the minimum arc voltage for most contact materials. A stable arc typically cannot exist below 15 volts. However, the power demands of vehicles are increasing to a point where the current 14 volt system is no longer adequate. All current terminals will arc when mated and unmated under load at 42 volts. All contact metals can sustain a stable arc above 20 volts. It is hoped, however, that the new 42 volt electrical systems can employ electrical connectors and terminals that do not differ significantly from those used in standard 14 volt systems. Although electrical connectors are not typically mated and unmated under load, even infrequent occurrences can result in problems. Most automotive electrical connectors include connector position assurance devices that are supposed to insure that connectors are fully mated and not left in a partially mated configuration. However, they require manual operation and will only achieve their intended function if properly used. If connectors are left in a partially mated, arc susceptible configuration or if the connector work loose during transit, arcing could cause injury and/or damage for a 42 volt electrical system.

An electrical connector assembly comprising a receptacle connector and a mating plug connector shiftable toward each other through a mating travel distance to fully mate the receptacle connector to the plug connector. The receptacle connector includes a plurality of receptacle terminals mounted in a receptacle housing and the plug connector including a plurality of plug terminals mounted in a plug housing. When mating begins between the receptacle connector and the plug connector, a first inertial spring force opposing mating is generated before receptacle terminals and plug terminals reach an intermediate, partially mated position where arcing is possible between the receptacle terminals and plug terminals. Upon further movement toward a fully mated position of the receptacle connector and plug connector, a second spring force acting in a mating direction is generated. The first and second spring forces act to urge the receptacle connector and the plug connector away from an intermediate, partially mated position where arcing is possible between the receptacle terminals and the plug terminals. The first and second mating forces together act over only a portion of the mating travel distance of the receptacle.

In one embodiment, the receptacle connector has an inertial protrusion extending into the mating cavity from at least one interior surface of a receptacle housing wall. An inertial protrusion is located on an exterior surface of the plug connector housing, and the receptacle connector inertial protrusion and the plug connector inertial protrusion are mutually engagable during mating and unmating to force mating terminals away from an intermediate, partially mated position in which arcing between receptacle connector terminals and plug connector terminals can occur. These inertial protrusions will increase the mating and unmating velocities to minimize the arc times. If contacts are to be mated and unmated under load, the contact disconnect time must be short and the mating velocities high.

In another embodiment, an over-center lever is mounted on one connector housing. The lever engages the mating electrical connector to apply a force along a mating axis to mate and unmate the two electrical connectors. An additional spring force parallel to the mating axis is generated by actuation of the lever. The spring force urges the mating electrical connector toward either a pre-stage position or a fully mating position and away from an intermediate partially mated position in which arcing may occur between pin terminals in the electrical connector and mating terminals in a mating electrical connector. This additional spring force is generated by deformation of a cantilever beam about which the over-center lever pivots.

DETAILED DESCRIPTION OF THE PREFERRED EMBODIMENTS

Figure 1:
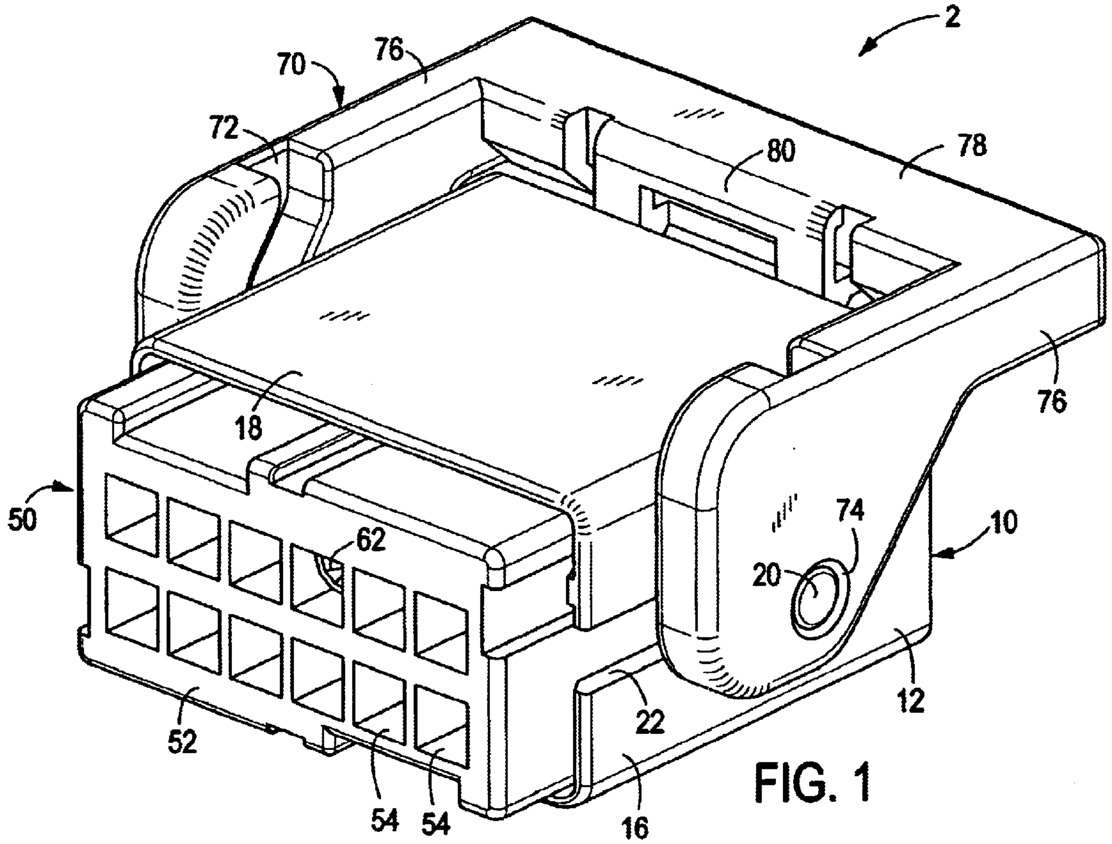
FIG. 1 is a three dimensional representation of a first embodiment of a connector assembly in which the two mating connectors are biased so that they do not remain in a partially mated position in which arcing can occur between unmated terminals.

The connector assembly 2, which comprises the first embodiment of this invention, is the subject of FIGS. 1–6, in which components and the operation of the connector assembly are shown. Connector assembly 2 includes a receptacle connector 10 and a mating plug connector 50. Pin terminals 44 are positioned within a molded receptacle connector housing 12, and socket terminals 62, matable with the pin terminals 44, are mounted in a molded plug housing 52. A mechanical assist lever 70 is pivotally mounted on the receptacle housing 12, and engages the plug housing 52 to apply a force between the two connectors 10 and 50 to either mate or unmate the plug connector 50 from the receptacle connector 10. Projections 24 are located on the receptacle connector housing 12 in opposition to projections 56 on the plug connector housing 12. These projections 24 and 56 will cause deformation of at least portions of the receptacle connector housing during movement between a pre-stage position and a fully mated position. As will be subsequently described in greater detail, these projections 24 and 56 form inertial means that function to bias the two connectors 10 and 50 away from an intermediate, partially mated position in which corresponding matable terminals 44 and 62 are in close proximity and are susceptible to arcing if the connectors are mated or unmated in a hot or current carrying state.

Figure 2:
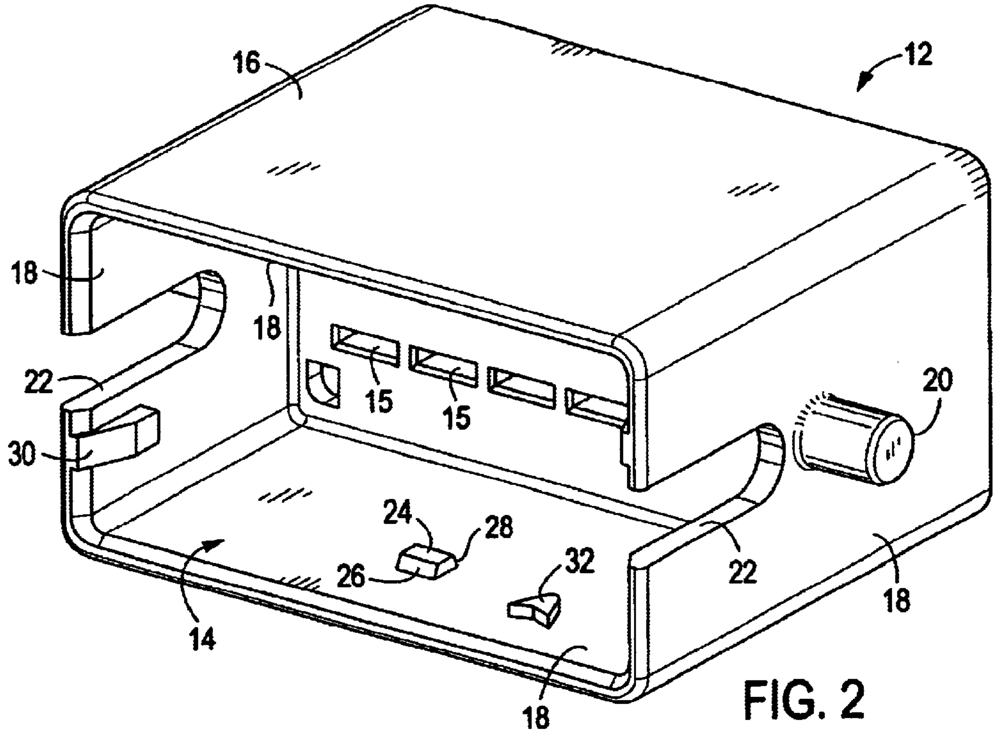
FIG. 2 is a view of a receptacle connector housing of the type used in the assembly of FIG. 1.
Figure 5:
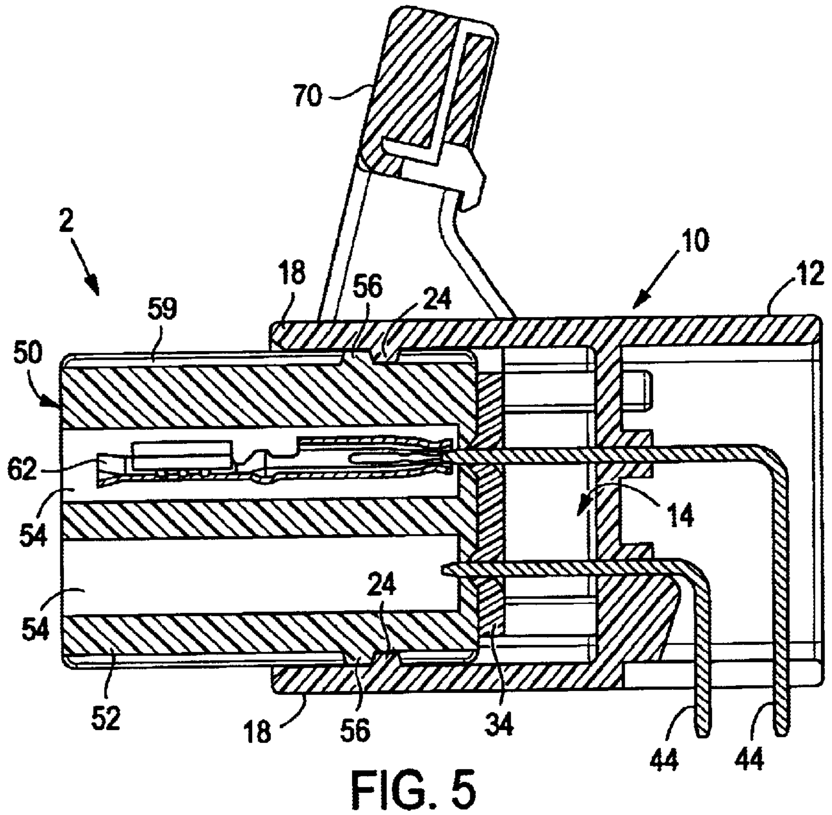
FIG. 5 is a sectional view of the two connectors forming the connector assembly of FIG. 1 in which two corresponding terminals are shown in an arc susceptible position.
Figure 6:
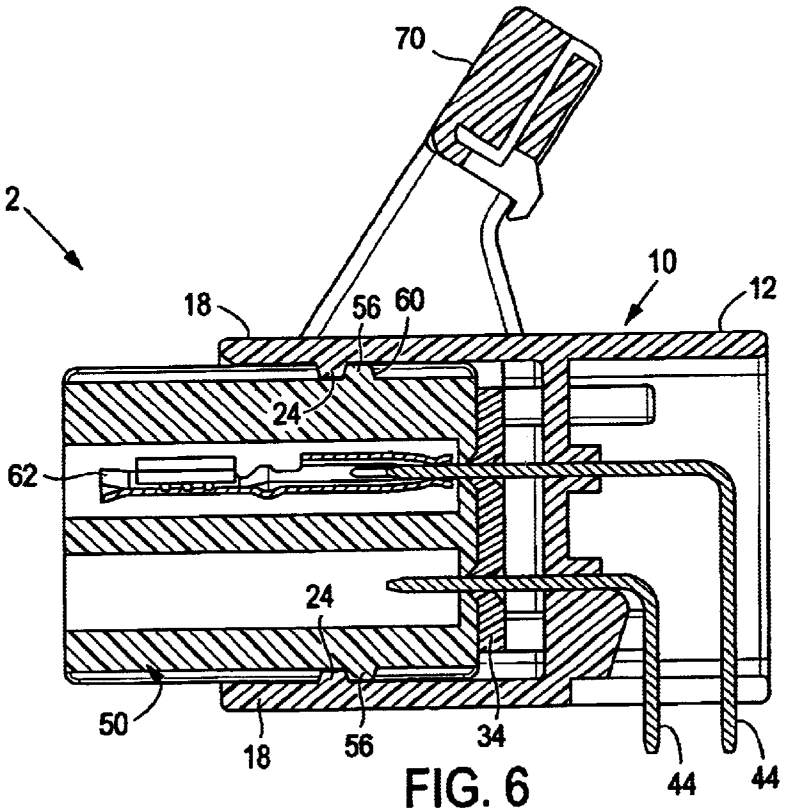
FIG. 6 is a sectional view in which the two connectors are in a position in which the two contacts are mated so that current can be carried by the two connectors without arcing.

The receptacle connector housing 12, shown in FIG. 2 is a one-piece molded member. A mating cavity 14, located on a mating end of housing 12 is formed by a housing shroud 16, formed by four shroud walls 18. Terminal cavities 15 extend through an interior wall forming the rear of the mating cavity 14. As shown in FIGS. 5 and 6, male terminal pins or blades 44 extend through these terminal cavities 15 into the mating cavity 14, where these male terminals can be received within the plug connector 50 to mate with female or socket terminals 62. In the preferred embodiment of this invention, the male terminals 44 comprise right angle printed circuit board pins. The pin terminals 44 and the socket terminals 62 used in the preferred embodiment of this invention have a current rating of 25 amps.

Figure 3:
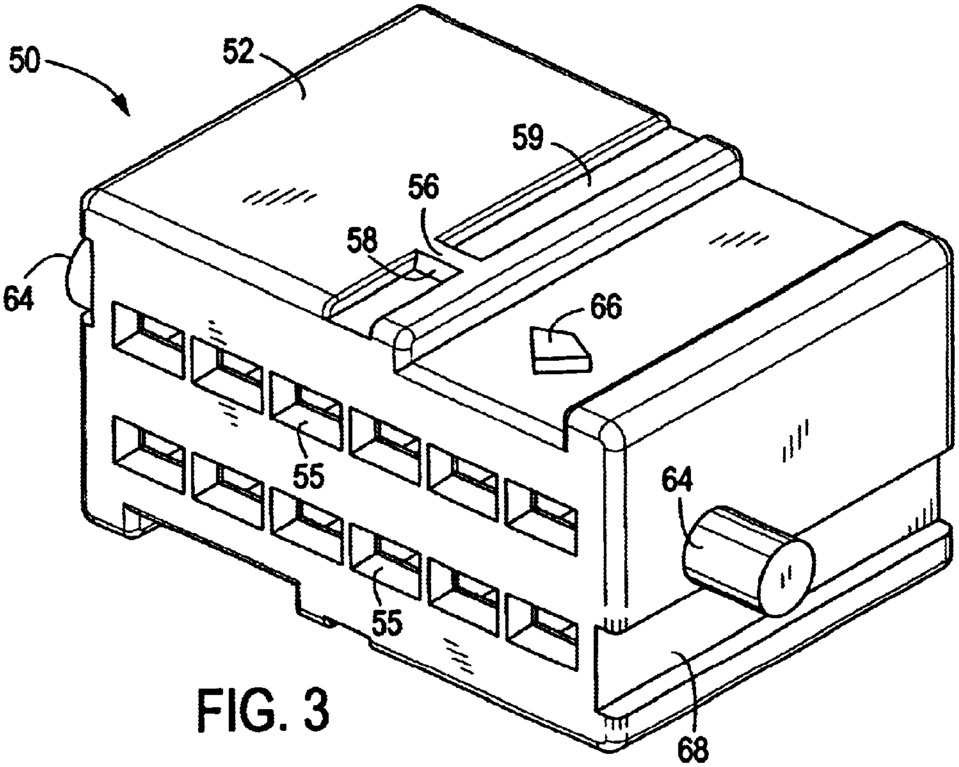
FIG. 3 is a view of a plug connector housing of the type used in the assembly of FIG. 1.
Figure 4:
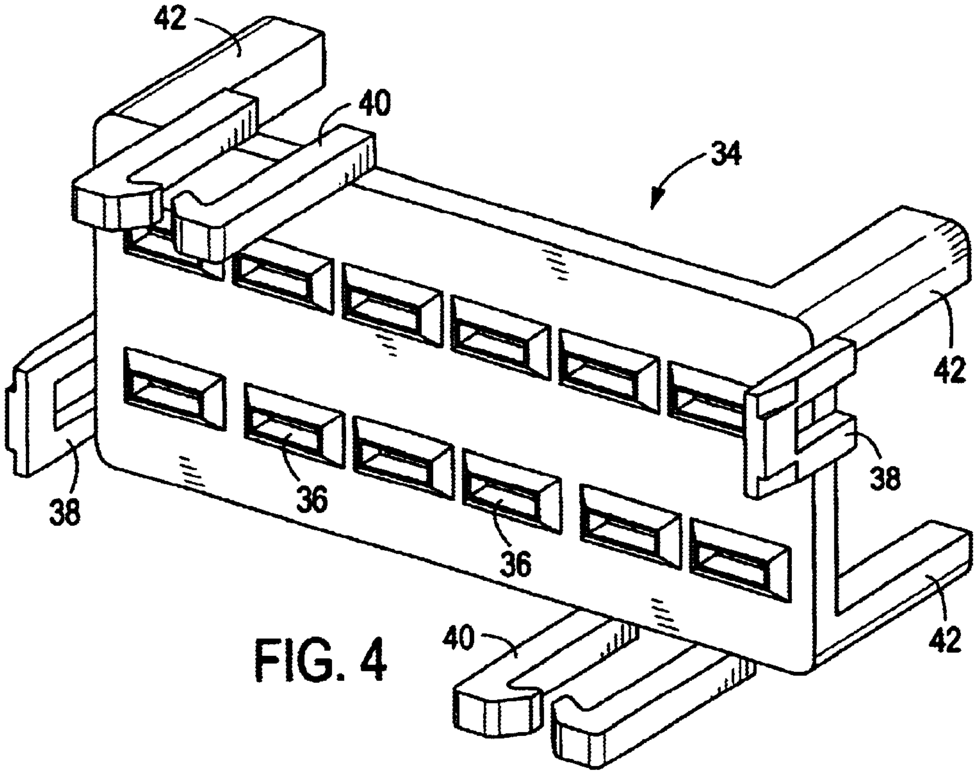
FIG. 4 is a view of a pin protection plate that is mounted in the receptacle connector housing to guide terminals during mating.

The receptacle connector housing 12 also has two slots 22 extending from the mating face into side walls forming the housing shroud 16. These slots 22 provide clearance for cylindrical pins 64 located on the exterior of the plug housing 52, as shown in FIG. 3. Two molded pins 20 extend from the sides of the housing 12 just to the rear of the root of the slots 22. The molded pins 20 form the fulcrum of the lever 70, when it is mounted on the receptacle housing 12.

Three projections or bumps are located on the interior of the shroud wall 18, and extend into the mating cavity. Inertial protrusion 24 is adjacent the front lip of the lower shroud wall 18, as shown in FIG. 2. As shown in FIGS. 5 and 6, an identical inertial protrusion 24 extends into the top of the mating cavity 14. The inertial protrusions 24 have a front sloping surface 26 and a rear sloping surface 28. In the preferred embodiment of this invention, the height of each protrusion 24 is equal to approximately 0.047 inch and the surfaces 26 and 28 are inclined at an angle of one hundred and five (105) degrees relative to the interior face of the corresponding shroud wall 18. These inertial protrusions 24 will work with similar, but opposing, protrusions 56 on the plug housing 52 to prevent the receptacle connector 10 and the plug connector 50 from staying in an intermediate, partially mated, position in which the leading edges of a pin terminals 44 are in close proximity to the entrance of corresponding socket terminals 62, where the terminals are susceptible to arcing in a 42 volt automotive electrical connector system. The manner in which these protrusions 24 and 56 act together during mating and unmating of the receptacle connector 10 and the plug connector 50 will be subsequently described in greater detail.

Two other molded projections 30 and 32 are also located on the interior of the shroud walls 18. Each of these projections 30 and 32 engage a pin protection plate 34, shown in FIG. 4, to retain the pin protection plate 34 in the mating cavity 14 and to shift the pin protection plate 34 into an extended position to protect the terminals 44 prior to mating the two connectors or when the plug connector 50 is withdrawn from the mating cavity 14 and to provide shock protection. The plate retention projection 30, located below slot 22 on a side shroud wall 18, prevents retraction of the pin protection plate 34 from the mating cavity 14. Plate retention projections 30 are located on both shroud side walls 18. The plate positioning projections 32 are located adjacent to the inertial protrusion 24, and plate positioning projections 32 are located on both the top and bottom shroud walls 18. The plate positioning projections 32 will engage pin plate transfer arms 40 to function as a stop limiting inward movement of the pin protection plate 34.

The plug connector housing 52 is shown in FIG. 3. The preferred embodiment of this plug housing 52 is molded as a single piece, and it includes two rows of side-by-side terminal cavities 54, two individual cavities being shown in FIGS. 5 and 6. The entrance 55 to each of these cavities 54 is dimensioned to receive one of the pin terminals 44 during mating, and the socket terminals 62 are positioned within the terminal cavities 54. Inertial protrusions 56 are located on the top and bottom faces of the plug housing 52. As shown in FIG. 3, the inertial protrusion 56 on the top surface is located within channel 59 extending between a mating and a rear face of the housing 52. The inertial protrusion 56 on the bottom surface is located in a similar channel. The inertial protrusion 56 has a sloping front surface 58 and a sloping rear surface 60. These sloping surfaces 58 and 60 are inclined relative to the housing face from which they protrude at substantially the same angles formed by sloping surfaces 26 and 28 on the receptacle connector inertial protrusion 24. When the plug protrusions 56 abut the receptacle protrusions 24, the receptacle connector shroud housing walls 18 are outwardly deflected to permit the receptacle protrusions 24 to pass over the plug protrusions 56. The protrusions are shaped so that receptacle connector 10 is in an unstable position relative to the plug connector 50 when the protrusions 24 ride over the protrusions 56. The channel is dimensioned to receive the receptacle protrusion 24 in all of the remaining relative positions of the receptacle connector 10 and the plug connector 50. The relative positions of protrusions 24 and 56 are thus chosen so that they will be in unstable engagement when the connectors 10 and 50 are in an intermediate, partially mated position in which mating terminals 44, 62 will be in close proximity, but not fully mated, where an arc can occur. The inertial protrusions 24 and 56 thus work to force the terminals 44, 62 away from this arc susceptible position, either toward a fully mated configuration or toward an unmated or pre-staged position. As opposed protrusions 24 and 56 slide along opposed sloping surfaces, the force applied between the two connectors will accelerate them away from the partially mated condition, arc susceptible position, and if an arc were to momentarily occur, the acceleration would help to rapidly mate the terminals and extinguish the arc. Although the inertial protrusions 24 and 56 will act to move the two connectors and the terminals away from the intermediate, partially mated position in which the terminals are susceptible to arcing in the presence of a potential difference, these protrusions 24 and 56 need not act over the entire distance which the connectors must travel from a pre-staged to a fully mated configuration. It is only necessary that these protrusions 24 and 56 act over a relatively short distance because the portion of the mating travel in which an arc is possible is much smaller than the entire mating travel of the connectors.

The inertial protrusions 24 and 56 function during mating to rapidly establish a high and stable contact normal force where and arc cannot occur. An arc will not occur unless there is some form of contact separation, which leads to a drop in normal force. When contacts are unmated without some form of arc suppression, it is desirable that the disconnect velocity be high and the inertial protrusions 24 and 56 act together to increase the disconnect velocity when the contacts are in an arc susceptible position. The protrusions 24 and 56 cause the mating connectors, when unmated, to move to a position in which there will be an air gap separating the contacts so there will be no or minimal tendency to arc through air. Although arcing is not as severe during mating as during unmating, it is nevertheless desirable that both high mating and unmating velocities be achieved, and the inertial protrusions 24 and 56 function to achieve high velocities in both directions.

The plug housing 52 also includes posts 64 extending from opposite sides. These posts or pins 64 will be received within a lever cam groove or cam profile 72 so that rotation of the lever 70 will move the pins 64 along the lever groove, thus forcing the plug connector 50 to move in either the mating or unmating direction relative to the receptacle connector 10. Pins 64 are dimensioned to move within the slots 22 on the sides of the receptacle connector housing 12.

Diamond shaped projections 66, one of which is shown in FIG. 3, are located on the top and bottom of the plug housing 52. These projections 66 engage the plate transfer arms 40 on pin plate 34 to retract the pin plate when the two connectors are unmated or are moved from a fully mated configuration to a pre-stage configuration. Plug housing 52 also includes recesses 68 that provide clearance for latch arms 38 located on the ends of the pin protections plate 34.

The connector assembly 2, also includes a mechanical assist lever 70 that can be used to apply forces to mate and unmate the receptacle connector 10 and the plug connector 50. Lever 70 includes two arms 76 extending from opposite ends of a lever base 78. Each lever arm 76 also includes a camming groove 72 facing inwardly. Pin openings 74 are located adjacent to the camming groove 72, and openings 74 are dimensioned to receive the receptacle housing pins 20, so that the lever will pivot about the pins 20. The camming groove 72 is dimensioned so that the plug actuating pins 64 move along the camming groove 72, as the lever 70 is rotated, thus imparting relative movement between the receptacle connector 10 and the plug connector 50.

In order to first insert the plug connector 50 into the receptacle connector mating cavity 14, the lever 70 is first rotated to an upright position in which the entrance to camming groove 72 is aligned with the slot 22 on the side of the receptacle housing 12. In this position, the plug pins 64 can be inserted into both the groove 72 and the slot 22 so that the plug connector can be inserted part way into the mating cavity 14. At this point the terminals 44 and 62 will be separated by a distance sufficient to prevent arcing between opposed, matable terminals. The plug connector 50 will, however, be at least partially restrained with the mating cavity 14. The lever 70 can also be partially rotated in a counterclockwise direction, as shown in FIG. 5 to partially restrain the plug connector 50 in this initial position, which can be referred to as a pre-stage configuration. As shown in FIG. 5, the leading ends of terminals 44 and 62 are separated and the receptacle inertial protrusion 24 is in initial contact with the plug inertial protrusion 56. The plug connector 50 cannot move from the position shown in FIG. 5 unless a force is applied along the mating axis, an axis parallel to the longitudinal direction of sockets 62. The connectors can be shipped in this manner, or they can be positioned in this manner during assembly or servicing. Typically the sockets 62 would be crimped to wires before insertion into the plug terminal cavities 54, but for the purpose of illustration, one socket terminal is shown in FIG. 5. Details of the socket terminal retention mechanism are not shown in FIGS. 5 and 6, but the socket terminals 62 are held in the terminal cavities 54 by conventional means that are not critical for the functioning of this device.

FIG. 6 shows the relative positions of the plug connector 50 and the receptacle connector 10 after the lever has been rotated sufficiently to bring socket terminals 62 into engagement with pin terminals 44. In the position shown in FIG. 6, the terminals 62 and 44 are in sufficient contact so that no arc will occur between the terminals, and all of the current will pass through the electrically conductive terminals themselves. In this minimum fully mated position, the contacts are in a position consistent with USCAR requirements for 2 mm of contact wipe past lead in geometry. If the connector is accidentally left in this position, there will be no adverse effects. In the preferred embodiment, the terminals 44 and 62 should be moved a sufficient distance to provide 2 mm. of wiping action along their mating surfaces. It should be noted that relative movement from the position shown in FIG. 5 to that shown in FIG. 6, has resulted in relative movement of the receptacle inertial protrusions 24 from a position on the inside of plug protrusions 56 to a position on the outside of the plug protrusions 56. In order to move between these positions, the inertial protrusions 24, and the walls 18 from which they extend, must deflect outwardly so that protrusions 24 can pass over protrusions 56. It is while the inertial protrusions 24 are passing over the inertial protrusions 56, between the positions shown in FIGS. 5 and 6, that the leading ends of terminals 44 and 62 will be in sufficiently close proximity that they are susceptible to the formation of an arc through the air separating them, if the connectors are mated or unmated in the presence of a live current or load. This is true for both mating and unmating, that is movement from the position of FIG. 6 to the position of FIG. 5. Indeed an arc is more likely to occur as the connectors are unmated under load. To fully mate the connectors 10 and 50, the lever 70 is rotated from the position shown in FIG. 6 to a position corresponding to that shown in FIG. 1. In this position, a connector position assurance latch 80 on the lever arm base 78 will engage a surface on the rear of the receptacle housing 12. This latch 80 can be released to unmate the two connectors.

The inertial protrusions 24 and 56 will interfere with movement of pin protection plate 34, which moves along the mating axis during mating and unmating of the connectors. In the extended position, the pin protection plate will be adjacent the ends of the pins 44, where it will protect the pins from damage and will prevent an operator from inadvertently contacting the pins before the plug connector 50 is inserted to the pre-stage position.

FIGS. 7–14 show a second embodiment of an electrical connector assembly 102 that develops forces which prevent a receptacle connector 110 and a plug connector 150 from remaining in an intermediate, partially mated position in which terminals in the two connectors are in a position in which they are susceptible to arcing. This connector assembly employs an over-center lever 170 to generate a force that will urge the two connectors 110 and 150 away from the intermediate, partially mated, arc susceptible configuration. This force is generated by deflection of an arm 120 to which the lever 170 is mounted.

The plug connector 150 is received within a mating cavity 114 that extends into the molded receptacle housing 112. The mating cavity 114 is formed by four housing walls 118 that form a housing shroud 116.

Mating male and female terminals similar to that shown in the embodiment of FIGS. 1–6 can be employed in connector assembly 102. Alternatively mating terminals that each can be terminated to wires can also be employed. Although some terminal configurations may be more susceptible to arcing damage than other configurations, the inventive aspects of this connector assembly 102 are not dependent upon the exact configuration of the mating terminals. For this reason, the terminals are not shown in FIGS. 7–14.

Receptacle connector 110 includes a molded cantilever beam 120 that extends from the rear of the connector housing 112. In the preferred embodiment, this arm or beam is part of the one piece molded connector housing 112, but the cantilever beam 120 could be a separate part attached to the main housing 112. A separate cantilever beam 120 can also be made of a more resilient material, such as a spring metal, and not be a molded plastic component or extension of the connector housing 112. The cantilever beam 120 includes a base 122 extending from the rear of the housing 112. This base 122 is joined to an arm section 124 by an intermediate curved section and that extends parallel to adjacent face of the connector. Wings 126 extend downward from the arm section 124 on opposite sides, and a mechanical assist lever 170 is connected to the cantilever beam 120 by these wings. The lever 170 also is free to rotate or pivot relative to the curved cantilever beam 120.

A slot 130 is formed on each side of the receptacle housing 112. This slot 130 is wide enough for an actuating pin 178 on the lever 170 to pass through the slot 130 and engage the plug connector 150. Slot 130 includes an arcuate section 132 adjacent the front of the receptacle connector 110. The arcuate section 132 has a center of curvature that corresponds with the pivot point or fulcrum 128 of the lever 170. The slot 130 also includes a linear section 134 that joins the arcuate section 132 and that extends parallel to the mating axis of the connector assembly 102. As the lever 170 is initially pivoted about the fulcrum 128, the actuating pin 178 initially follows a curved path while it is in the arcuate section 132. Thereafter the actuating pin follows a linear path from the front to the rear of the linear slot section 134. Deflection of the cantilever beam 120 allows the actuating pin 178 to follow this compound path.

The molded plug connector housing 152 includes a number of terminal cavities 154 in which plug connector terminals, not shown, can be mounted. Inclined slots 156 are located on opposite sides of the plug connector housing 152, and lever actuating pin 178, extending through slot 130 extends into the inclined plug slot 156.

Figure 7:
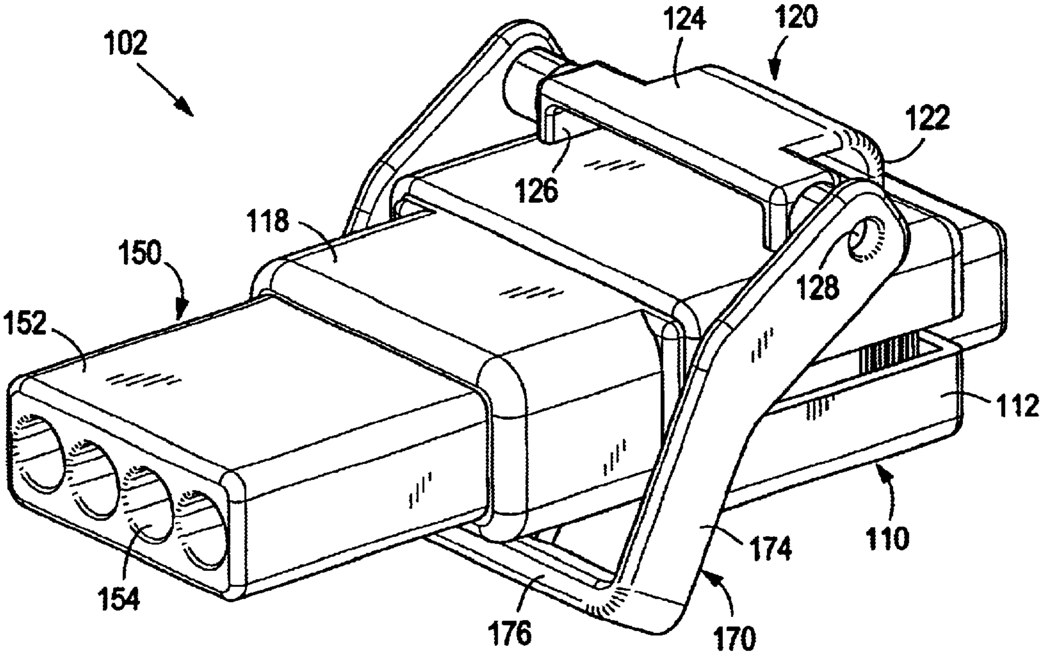
FIG. 7 is a three dimensional view of an over-center lever connector assembly in a pre-stage position.
Figure 8:
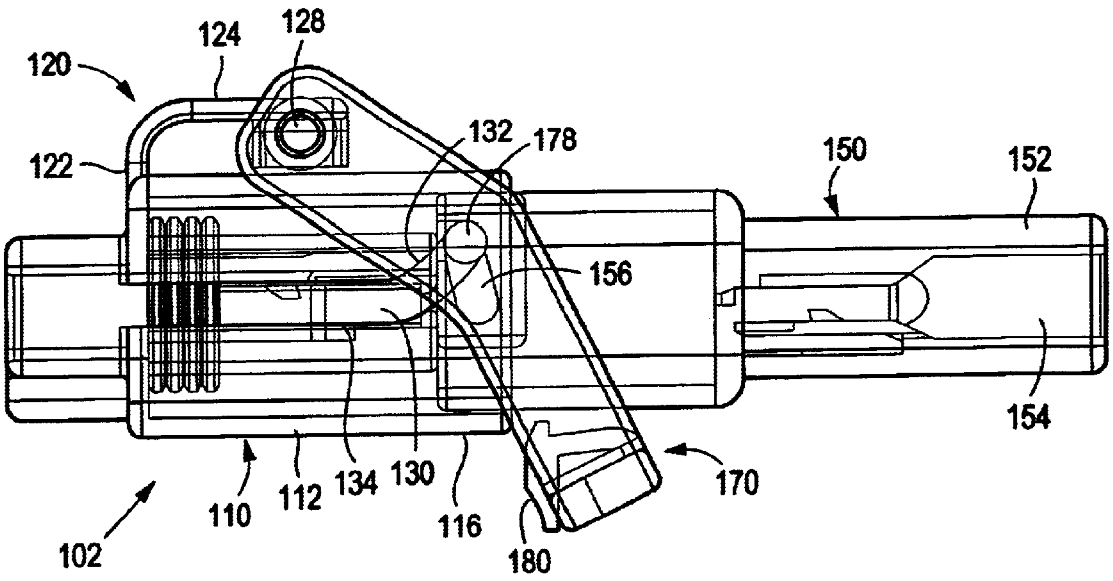
FIG. 8 is a side view, with internal structures diagrammatically shown, of the over-center lever connector assembly in the pre-stage position also shown in FIG. 7.

In FIGS. 7 and 8, the receptacle connector 110 and the plug connector 150 are in the pre-stage position. In this position, the plug connector housing 152 would be partially mated with the receptacle connector housing 110. The actuator pin 178 would extend through slot section 132 and into slot 156, thus holding the two partially mated connectors together in this pre-stage position. The terminals in the receptacle connector 110 and in the plug connector 150 would be widely spaced and would not be close enough for arcing to occur.

Figure 9:
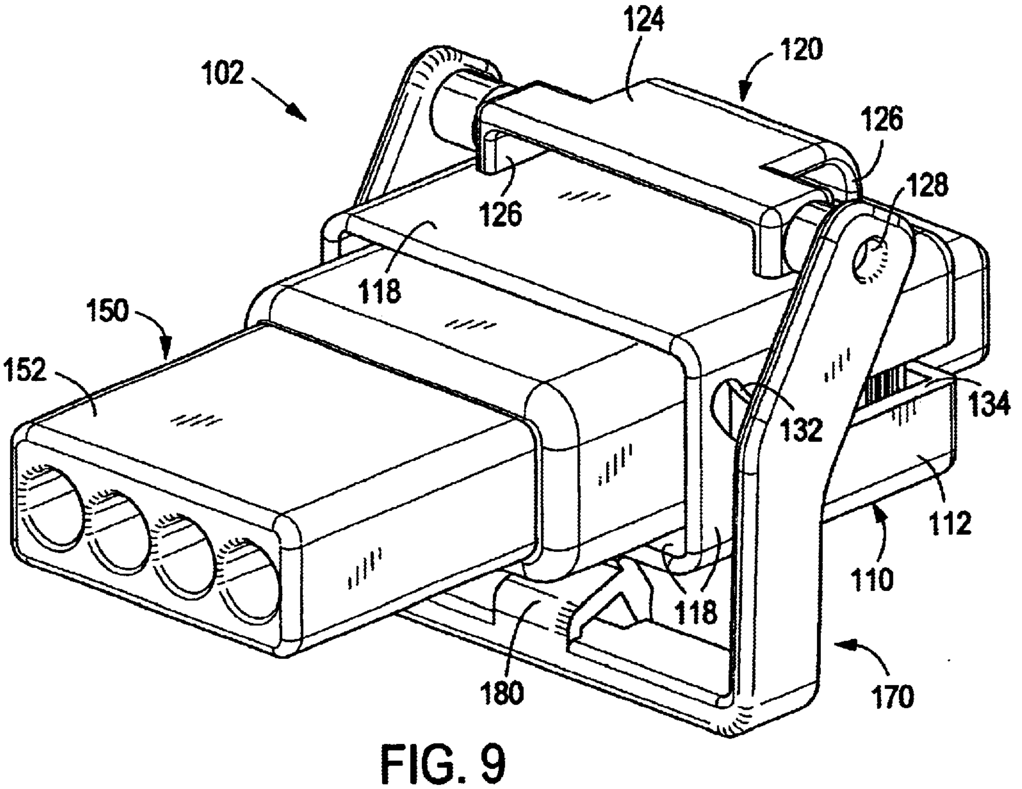
FIG. 9 is a three dimensional view of an over-center lever connector assembly in which rotation of the lever has begun, but in which terminals in the two connectors would not be close enough for arc initiation.
Figure 10:
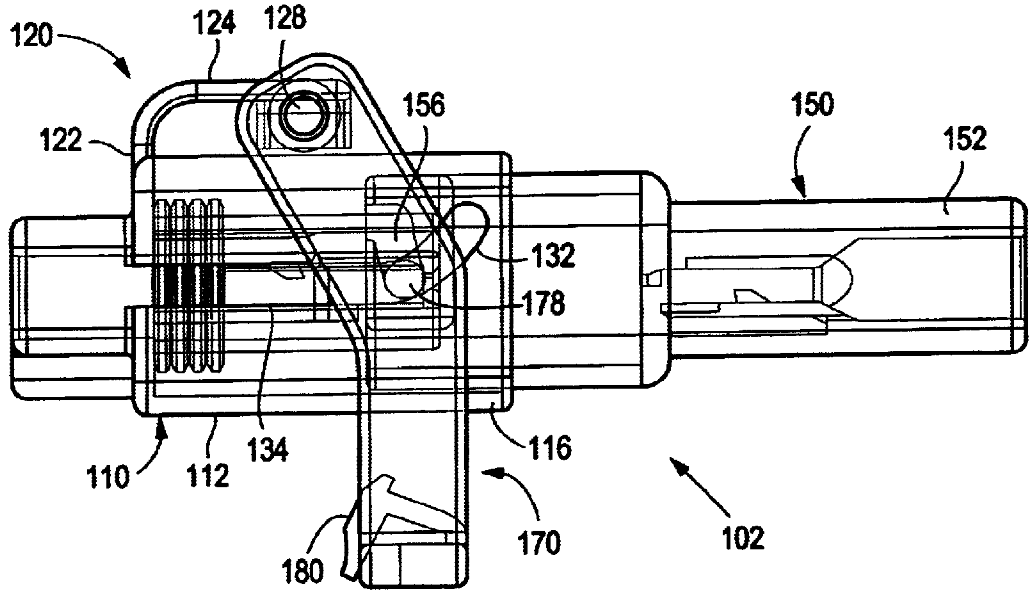
FIG. 10 is a side view, with internal structures diagrammatically shown, of the over-center lever connector assembly in the position also shown in FIG. 9.

In FIGS. 9 and 10, the lever 170 has been rotated about the pivot or fulcrum 128 to a position in which the plug connector 150 is partially mated to the receptacle connector. Rotation of the lever 170 from the position shown in FIGS. 7 and 8 to the position shown in FIG. 9 and 10 causes the pin 178 to move through the arcuate or curved slot section 132. The pin 178 will also move from the top of plug slot 156 to the bottom of that slot 156 causing a small movement of the plug connector 150 into the mating cavity 114. Further axial movement of the pin 178 relative to the plug slot 156 is no longer possible, because the pin is now positioned at the root of slot 156. Although the two connectors 110 and 150 have moved from the pre-stage position to a first partially mated position, the terminals in the two connectors are still not close enough to result in arcing. Movement of the lever from the pre-stage to the first partially mated position has also occurred without deformation or deflection of the cantilever beam 120, and the pivot or fulcrum 128 has remained in its neutral, unstressed position relative to the remainder of the receptacle connector 110 and the plug connector housing 112. The pin 128 is not deflected because the actuating pin 178 has moved in a curved slot section 132, whose center of curvature coincides with the position of pivot or fulcrum 128.

Figure 11:
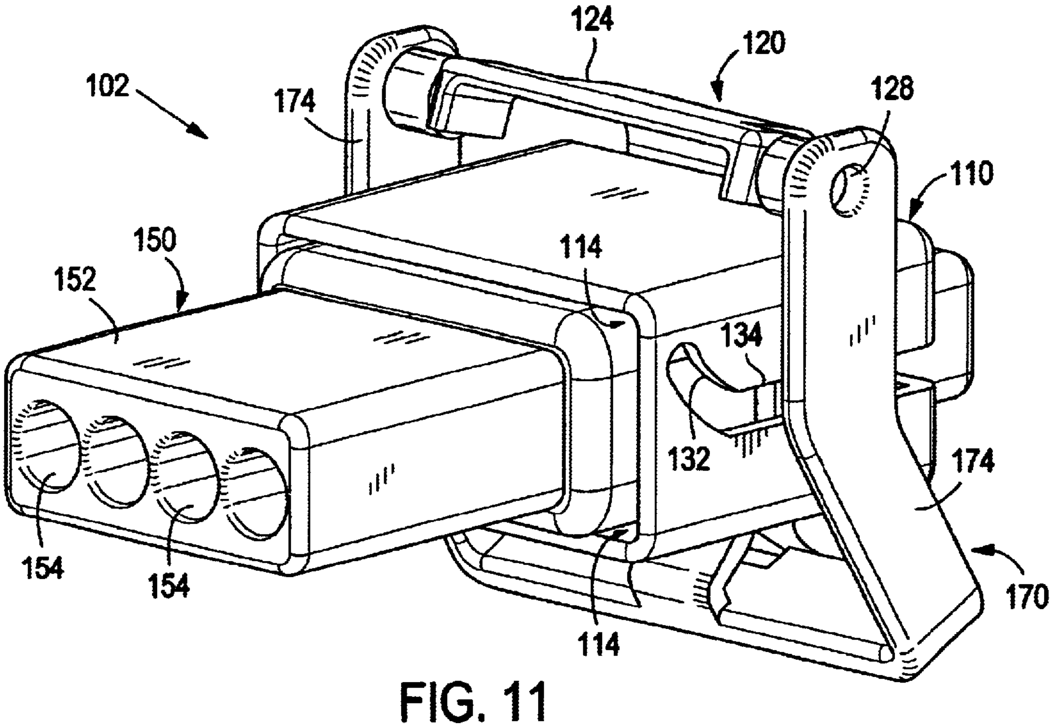
FIG. 11 is a three dimensional view of an over-center connector assembly in which the connectors have moved to an intermediate, partially mated position in which arcing could be a problem. Deflection of the lever mounting arm to create a force tending to move the connectors away from this position is also shown.
Figure 12:
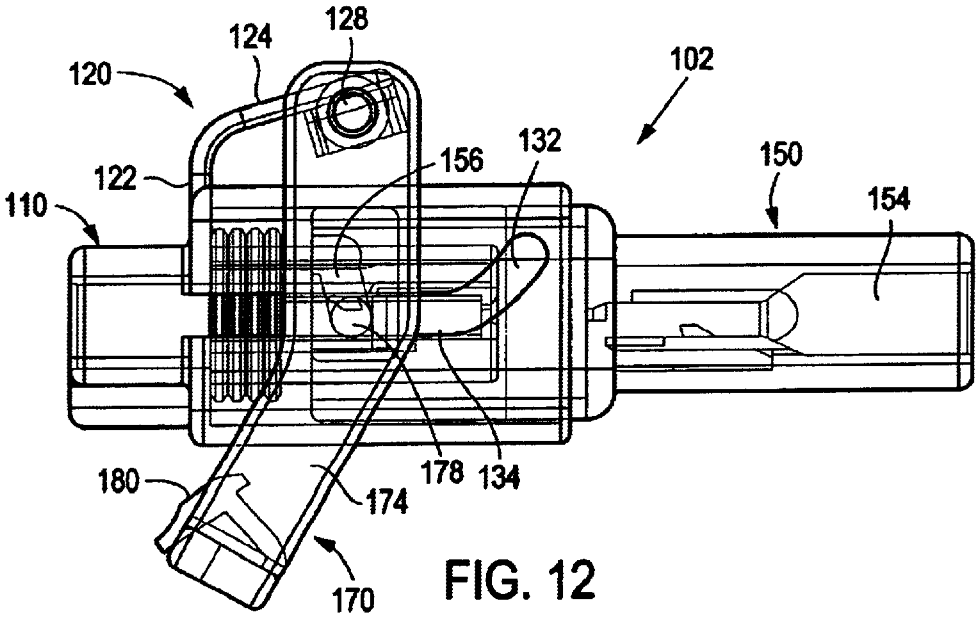
FIG. 12 is a side view, with internal structures diagrammatically shown, of the over-center lever connector assembly in the intermediate, partially mated position also shown in FIG. 11.

Continued rotation of the lever 170 causes the plug connector 150 to move from the position shown in FIGS. 9 and 10 to the position shown in FIGS. 11 and 12. When the connectors are in the intermediate, partially mated position shown in FIGS. 11 and 12, the leading edge of the receptacle connector terminals are sufficiently close to the leading edges of the plug connector terminals so that arcing can occur between receptacle and plug terminals. However, this is a mechanically unstable position in which the two connectors cannot remain in the absence of some external force holding them in this relative position. Movement of the lever from the position shown in FIGS. 9 and 10 to the position shown in FIGS. 11 and 12 has also resulted in deflection of the cantilever beam 120. Beam 120 is stressed in this position, and the actuating pin 178 must move axially along the linear slot section 134 in order for the cantilever beam 120 to return to an unstressed condition. Since the pivot 120 and the actuating pin 178 are fixed with respect to the lever arm 174, movement of the pin 178 along the linear slot section must result in movement of the fulcrum or pivot 128 away from the linear slot 134 as the pivot pin moves axially into a position beneath the pivot point 128. The upper section 124 of the cantilever beam 120 rotates upward so that the pivot 128 moves away from the slot section 134 and the rest of the receptacle connector housing 112. Since the cantilever beam 120 is joined to the rest of the connector housing through section 122, stresses must build up in the cantilever beam 120 at this point. Axial movement of the pin 178 within slot section 132, from the position shown in FIGS. 11 and 12 will reduce the deflection of cantilever beam 120 and will thus reduce the forces exerted on the plug connector 150 due to deflection of the cantilever beam 120. Since the configuration shown in FIGS. 11 and 12 represents one in which arcing can occur between plug and receptacle terminals, it is very desirable that the two connectors move away from this position to either separate plug and receptacle terminals or to bring them into sufficient mating engagement so that arcing through air between terminals will no longer occur.

Figure 13:
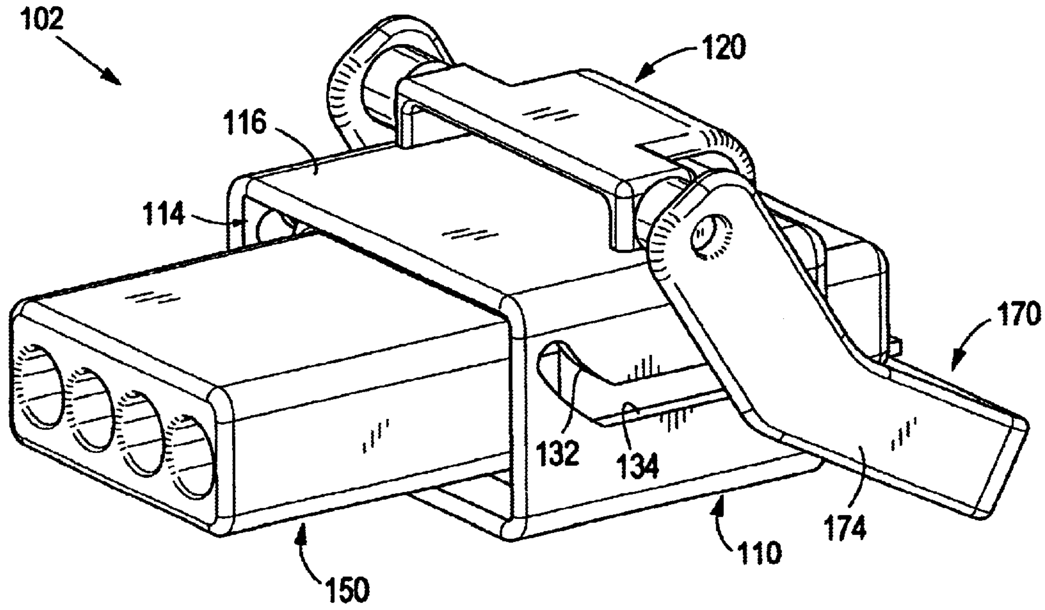
FIG. 13 is a three dimensionally view of the fully mated over-center connector assembly.
Figure 14:
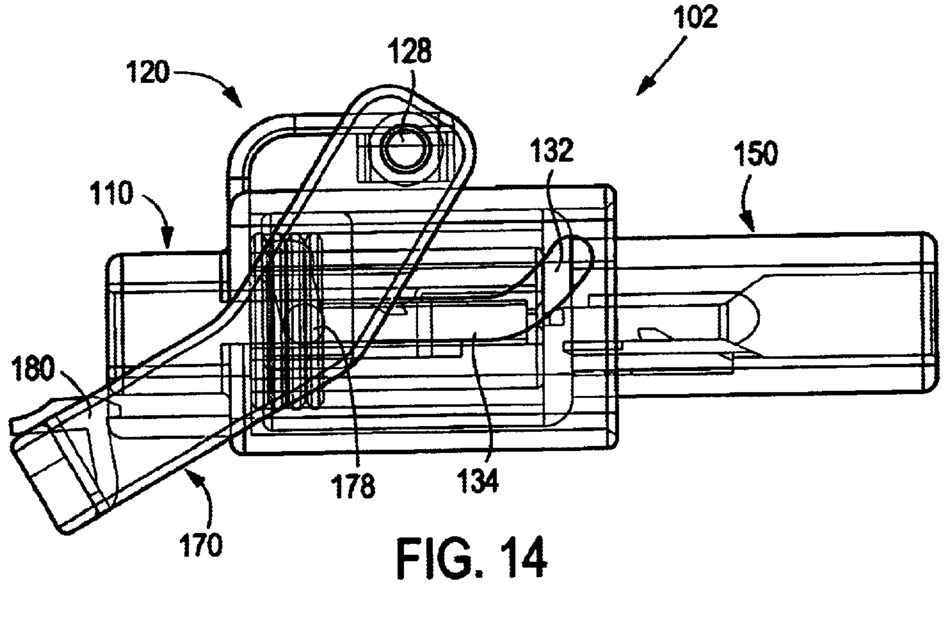
FIG. 14 is a side view, with internal structures diagrammatically shown, of the over-center lever connector assembly in the fully mated position also shown in FIG. 13.

FIGS. 13 and 14 show the fully mated configuration of the connector assembly 102. The plug connector 150 has been moved to this position by continued rotation of the lever 170. In this fully mated configuration the connector position assurance latch 180 has snapped into engagement with the receptacle connector 110. The actuating pin 178 has moved toward the root of the slot section 134 and the cantilever beam 120 has returned to its undeflected or neutral position. Terminals are fully mated and arcing will not occur. The connectors 110 and 150 have been brought to this fully mated position by a positive application of an external force to the the mechanical assist lever 170. However, even if any external force applied to the lever 170 had been removed when the connector assembly 102 was in the intermediate, partially mated, arc susceptible position shown in FIGS. 11 and 12, axial movement of the plug connector 150 relative to the receptacle connector 110, would still occur because of the spring force built up in the cantilever beam 120 by its deflection. The spring forces generated by the deflected cantilever beam 120 can be reduced either by movement of the plug connector 150 toward the fully mated configuration shown in FIGS. 13 and 14 or toward the initial or pre-stage positions of FIGS. 7–10. Movement in either axial direction will move the terminals away from an arc susceptible position.

Both of the representative embodiments depicted herein provide a means for generating a force parallel to the mating axis between two connectors so that the connectors are urged or biased away from an intermediate, partially mated, arc susceptible position. In each embodiment, one connector or a part of a connector housing is deflected to generate the spring force needed to prevent the connectors from residing in the arc susceptible position. In both of the embodiments depicted herein, both the mating and unmating velocities, at least through an arc susceptible region, are higher than for conventional connector configurations that do not include inertial features of which the two embodiments shown herein are representative. Furthermore each of these embodiments is suitable for use with other features, such as mechanical assist levers, terminal guide plates and connector position assurance devices that are typically used on high count electrical connectors, such as those used for automotive applications. Of course their use is not limited to motor vehicle electrical systems or to 42 volt automotive electrical systems. Furthermore, other embodiments would be apparent to one of ordinary skill in the art. The invention is therefore defined by the following claims and is not limited to the representative embodiments depicted herein.

We claim:

1. An electrical connector matable with a mating electrical connector, the electrical connector comprising terminals in a housing, the connector also including a member deformable only when the terminal of the electrical connector and the mating electrical connector are in a partially mated position; said member being deformable to impart a greater velocity through the partially mated position than during remaining travel during mating and unmating of the electrical connector with the mating electrical connector.

2. The electrical connector of claim 1 wherein the deformable member comprises an inertial member.

3. The electrical connector of claim 2 wherein the inertial member comprises a portion of the housing.

4. An electrical connector assembly comprising a receptacle connector and a mating plug connector shiftable toward each other through a mating travel distance to fully mate the receptacle connector to the plug connector, the receptacle connector including a plurality of receptacle terminals mounted in a receptacle housing and the plug connector including a plurality of plug terminals mounted in a plug housing, the receptacle connector and the mating plug connector being engagable to generate a first spring force opposing mating before receptacle terminals and plug terminals reach an intermediate, partially mated, position and upon further movement toward a fully mated position, the receptacle connector and plug connector being engagable to generate a second spring force acting in a mating direction so that the first and second spring forces act to urge the receptacle connector and the plug connector away from the intermediate, partially mated, position, the first and second mating forces together acting over only a portion of the mating travel distance of the receptacle connector and plug connector adjacent to and in the intermediate partially mated, position.

5. An electrical connector assembly comprising first and second matable electrical connectors, each electrical connector containing a plurality of terminals with corresponding terminals in each electrical connector mating when the electrical connectors are mated, wherein:

the first electrical connector includes a mechanical assist member for use in mating and unmating the first and second electrical connectors and the terminals therein, and wherein, one of the electrical connectors is deformable, only when the terminal of the two electrical connectors are in a partially mated position when deformation of the one electrical connector exerting a force on the other connector to move the terminal of the electrical connectors away from the partially mated position, the force being generated when the terminal of the two electrical connectors are in the partially mated position so as not to otherwise increase mating and unmating forces overcome by the mechanical assist member;

whereby arcing between corresponding terminals is avoided because the terminals do not remain in the partially mated position.

6. The electrical connector assembly of claim 5 wherein the first electrical connector is deformable when the two electrical connectors are in the partially mated position.

7. The electrical connector assembly of claim 5 wherein each electrical connector includes a housing in which respective terminals are positioned, the housing of one of the connectors being deformable when the electrical connectors are in the partially mated position.

8. The electrical connector assembly of claim 7 wherein an arm on which the mechanical assist member is mounted is deformable when the electrical connectors are in the partially mated, arc susceptible, position.

9. The electrical connector assembly of claim 7 wherein a portion of a housing wall is deflectable when the connectors are in the partially mated position.

10. The electrical connector assembly of claim 9 wherein the housing wall in one of the electrical connectors includes a protrusion engagable with the other electrical connector to deflect the housing wall of one of the electrical connectors.

11. The electrical connector assembly of claim 10 wherein each electrical connector includes a protrusion on a housing wall, the protrusions on the two housing walls engage to deform one of the housing walls.

12. The electrical connector assembly of claim 5 wherein the mechanical assist member comprises a lever.

13. An electrical connector assembly comprising first and second matable electrical connectors with first and second matable electrical terminals positioned respectively in first and second housings;

the first and second electrical connectors being partially mutually restrained in a pre-stage position in which the first and second terminals are spaced apart and the first and second housings are engaged, the first and second electrical connectors being shiftable from the pre-stage position to a fully mated position in which the first and second terminals are in conductive engagement;

at least one of the first and second housings being deflectable as the first and second connectors move between the pre-stage and the fully mated positions, maximum deflection occurring when the first and second terminals are in sufficiently close proximity for arcing to occur between the first and second terminals, but not in sufficient mutual engagement for electrical conduction to occur without arcing, deflection of the one housing exerting a spring force on the other housing to cause the first and second electrical connectors to move either toward the pre-stage or the fully mated position by a sufficient distance to eliminate arcing between first and second terminals but not by a sufficient distance to return the first and second electrical connectors to the pre-stage or fully mated positions, whereby the first and second electrical connectors cannot be left in a partially mated configuration where arcing could occur.

14. The electrical connector assembly of claim 13 wherein the first connector includes a shroud and the second connector is partially positioned in the shroud in the per-stage position and in the fully mated position and during movement between the pre-stage and fully mated positions.

15. The electrical connector assembly of claim 14 wherein an inertial protrusion on the shroud causes deflection of the shroud as the first and second connectors are moved between the pre-stage and fully mated positions.

16. The electrical connector assembly of claim 15 wherein a sliding pin protection plate is located in the shroud, the inertial protrusions being located between the sliding pin protection plate and an open mating face of the shroud.

17. The electrical connector assembly of claim 13 wherein inertial protrusions are located on the first and second connector housings, the inertial protrusions engaging as the first and second connectors move between the pre-stage and fully mated positions.

18. The electrical connector assembly of claim 17 wherein engagement of the inertial protrusions accelerate movement of the first and second connectors away from a position in which arcing could occur as the first and second connectors mover between the pre-stage and the fully mated positions.

19. The electrical connector assembly of claim 13 wherein an over-center lever is connected to the first and second connectors.

20. The electrical connector assembly of claim 19 wherein the over-center lever is mounted on a deflectable beam extending from the first connector housing.

21. The electrical connector assembly of claim 20 wherein deflection of the deflectable beam exerts a force on the second connector accelerating movement of the second connector toward either the pre-stage or fully mated position and away from a partially mated position in which arcing could occur.

22. The electrical connector assembly of claim 20 wherein the deflectable beam comprises a cantilever beam molded as part of the first connector housing.

* * * * *